(12) United States Patent
Murg

(10) Patent No.: US 6,179,427 B1
(45) Date of Patent: Jan. 30, 2001

(54) EYEPIECE COVER FOR BINOCULARS

(75) Inventor: Erwin Murg, Neu-Rum (AT)

(73) Assignee: Swarovski Optik KG, Absam (AT)

( * ) Notice: Under 35 U.S.C. 154(b), the term of this patent shall be extended for 0 days.

(21) Appl. No.: 09/374,272

(22) Filed: Aug. 16, 1999

(30) Foreign Application Priority Data

Jun. 25, 1999 (DE) .......................................... 299 11 126 U

(51) Int. Cl.⁷ .............................. G02B 21/00; G03B 11/04
(52) U.S. Cl. ............................ 359/600; 359/511; 359/407
(58) Field of Search .................................. 359/399, 402, 359/405, 407–410, 507–511, 600, 611; 396/529–534

(56) References Cited

U.S. PATENT DOCUMENTS

| | | | |
|---|---|---|---|
| 849,409 | * | 4/1907 | Martin .................................. 359/600 |
| 1,808,642 | * | 6/1931 | Duffy .................................. 359/600 |
| 4,641,932 | * | 2/1987 | Harms .................................. 359/511 |
| 5,640,271 | * | 6/1997 | Nishitani et al. ..................... 359/407 |

FOREIGN PATENT DOCUMENTS

| | | | |
|---|---|---|---|
| 460717 | 5/1928 | (DE) . | |
| 1151 | * | 3/1907 | (GB) .................................. 359/511 |
| 132033 | * | 9/1919 | (GB) .................................. 359/600 |

* cited by examiner

Primary Examiner—Thong Nguyen
(74) Attorney, Agent, or Firm—Fulbright & Jaworski, L.L.P.

(57) ABSTRACT

An eyepiece cover for binoculars has two cover parts (1, 2) connected by a joint (3). By rotation around the joint (3) the cover parts (1, 2) are adjusted to the distance between the eyepieces. The adjusted distance is fixed by the friction in the joint, whereby said friction can also be formed by a catch.

12 Claims, 1 Drawing Sheet

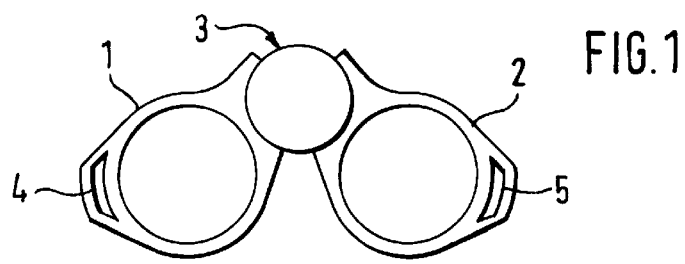
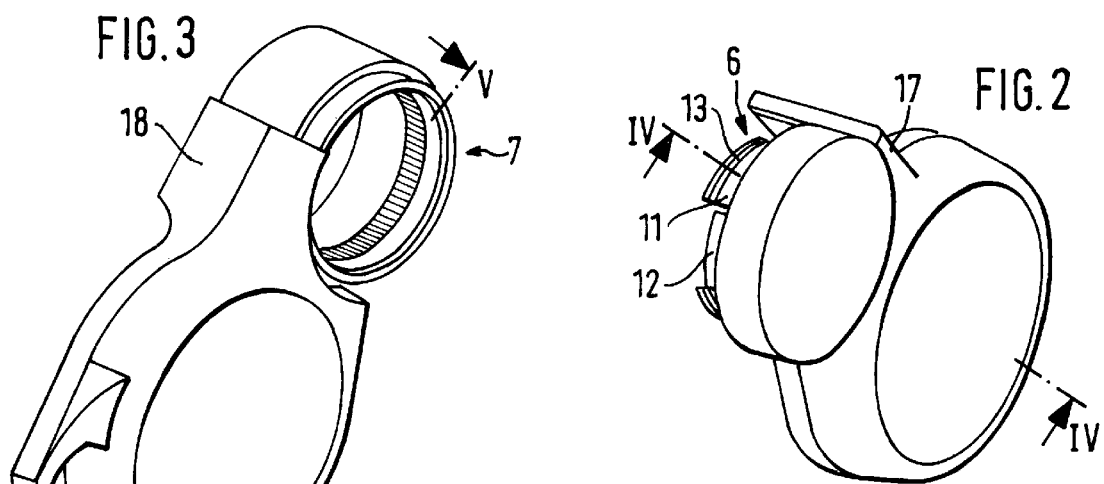
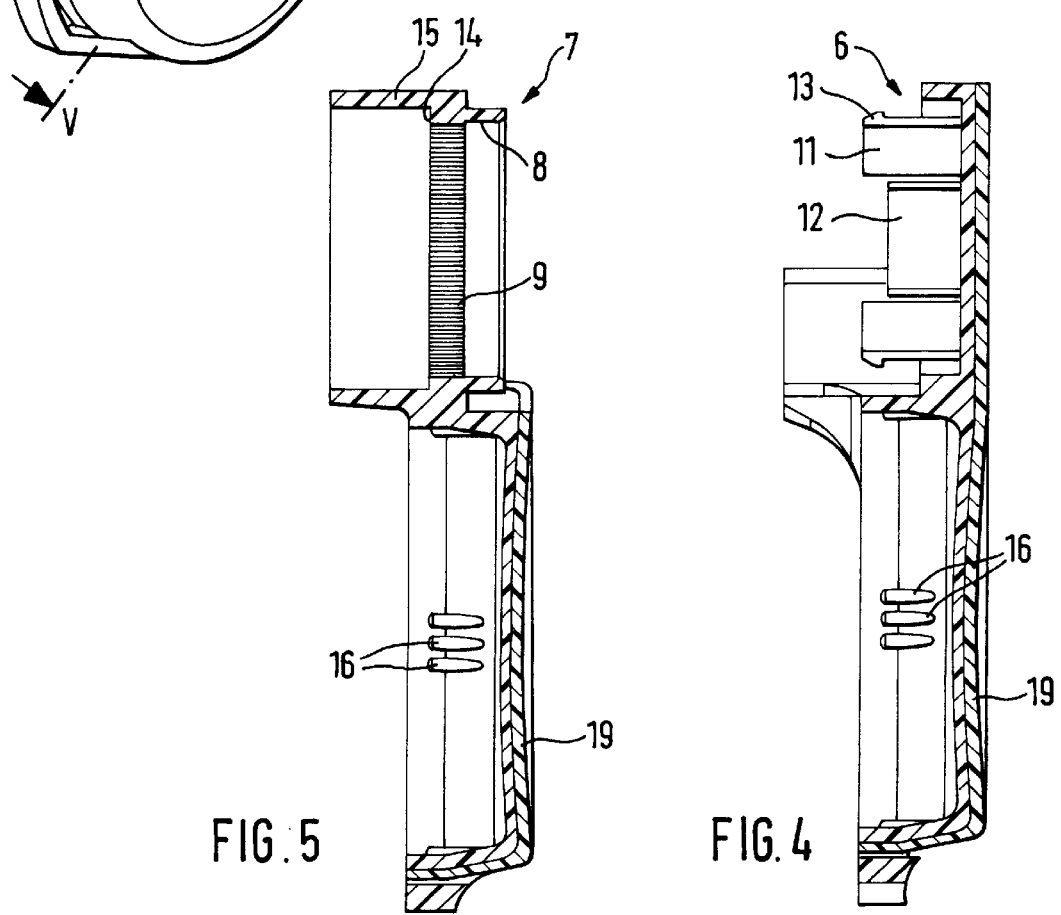
FIG. 1
FIG. 3
FIG. 2
FIG. 5
FIG. 4

EYEPIECE COVER FOR BINOCULARS

BACKGROUND OF THE INVENTION

1. Field of the Invention

This invention relates to an eyepiece cover for binoculars which has two saucer-shaped cover parts connected by a joint and adapted to be adjusted to the distance between the eyepieces by rotation around the joint and then mounted on one and the other eyepiece.

2. Discussion of the Related Technology

Such a cover is known. The joint is formed by an elastic connection between the two cover parts. Before mounting, however, the user must spend a certain amount of time bending the elastic connection into shape so that the distance between the cover parts corresponds to the distance between the eyepieces.

It is known from German patent no. 460 717 to adjust the cover to the eyepiece distance using a cross member on which two sealing washers are adapted to be -displaced and fixed. To permit the washers to be pressed against the eyepieces the cross member is fastened to the binoculars with a rubber band. According to German patent no. 428 456 the cross member is hinged to the binoculars.

SUMMARY OF THE INVENTION

The problem of the invention is to provide an eyepiece cover for binoculars which fits without additional operations on the eyepieces adjusted to a distance necessary for the particular user.

This is attained according to the invention in that the angular position of the two cover parts is adapted to be fixed by frictional engagement once it is adjusted with the joint.

The joint is preferably formed by a hinge joint with a cylindrical joint head on one cover part and a joint sleeve pivotally mounted on the joint head on the other cover part.

In order to form the frictional engagement, the joint sleeve and/or the joint head have a joint surface with a high coefficient of friction.

The high coefficient of friction can be obtained by a suitable material on the sliding surface and/or a suitable surface quality. A preferred surface is a knurl, i.e. axis-parallel grooves and ribs on the inside of the joint sleeve and the outside of the joint head.

It is especially preferred to provide a catch on the joint surface. For this purpose, the inside of the joint sleeve and the outside of the joint head can each be provided with a knurl, the ribs and grooves of the knurls being coordinated with each other such that they can lock. It is further necessary for this purpose that the joint sleeve and the link pin are spring-loaded radially toward each other.

For this purpose the joint head can be formed by cylindrical segments which are spring-loaded at least partly against the joint sleeve.

To permit the two cover parts to be fixed axially relative to each other, a snap connection is preferably provided. For this purpose at least part of the cylindrical segments of the joint head can be provided with outwardly protruding detents which grasp behind the joint sleeve slipped on the joint head.

In the inventive eyepiece cover the two cover parts are adjusted to the necessary distance between the eyepieces once by the user. The adjusted distance is fixed by the friction in the joint or the catch built into the joint. That is, the cover fits onto the binoculars at any eyepiece distance without additional operations having to be performed. In addition, free sliding of the cover on the strap is ensured since the strap eyelets on the cover parts are flush with the strap at any eyepiece distance. Also, the inventive eyepiece cover is characterized by a lightweight construction.

BRIEF DESCRIPTION OF THE DRAWINGS

In the following an embodiment of the inventive eyepiece cover will be explained by way of example with reference to the drawings, in which:

FIG. 1 shows a plan view of the eyepiece cover;

FIGS. 2 and 3 show perspective views of one and the other cover part; and

FIGS. 4 and 5 show sections along line IV—IV in FIG. 2 through one cover part and along line V—V in FIG. 3 through the other cover part.

DETAILED DESCRIPTION OF THE PREFERRED EMBODIMENTS

According to FIG. 1 the eyepiece cover consists of two cover parts 1 and 2 interconnected by joint 3. Each cover part 1, 2 is provided on the outside with strap eyelet 4, 5 through which the strap (not shown) fastened to one and the other tube of the binoculars (not shown) is guided, to retain the cover when completely detached from the binoculars.

Joint 3 is formed according to FIGS. 3 to 5 by a hinge joint and, as shown, is separate and distinct from the binoculars. That is, cylindrical joint head 6 is fastened to the circumference of one saucer-shaped cover part 1, and joint sleeve 7 to the circumference of other saucer-shaped cover part 2, sleeve 7 being pivotally mounted on head 6 when the latter is inserted into sleeve 7.

Cover parts 1, 2 including joint head 6 and joint sleeve 7 and optionally strap eyelets 4, 5 are formed integrally in each case, for example as injection molded parts of rigid plastic.

To fix an angular position of cover parts 1, 2 relative to each other once it is adjusted with joint 3, a frictional engagement is provided between joint head 6 and joint sleeve 7. For this purpose, joint sleeve 7 has knurl 9 or a similar rough formation on its inner or joint surface 8.

Joint head 6 is formed by cylindrical segments 11, 12, i.e. long tongue-shaped segments 11 for the snap connection and short segments 12 for the frictional engagement.

Snap hooks 13 produce a snap connection between cover parts 1, 2. That is, when joint sleeve 7 is slipped on joint head 6, snap hooks 13 grasp behind ring shoulder 14 between joint sleeve 7 and adjacent large-diameter portion 15. Cover parts 1, 2 are thus fixed axially relative to each other independently of an angular position of the binoculars.

Inwardly protruding wedge-shaped projections 16 are distributed in groups over the inside circumference of saucer-shaped cover parts 1, 2. When the cover is mounted they are pressed against the rubber-elastic cups (not shown) disposed around the eyepieces in order to fasten cover 1 to the binoculars.

Facings 17, 18 protrude from cover parts 1, 2 over the adjacent segments of joint head 6 and joint sleeve 7, respectively. Further, the outside of cover parts 1, 2 is provided with soft layer 19, for example of soft plastic, to improve the haptics.

What is claimed is:

1. A removable eyepiece cover for a pair of binoculars, comprising:

two cover parts connected by a joint and adapted to be slipped on respective eyepieces of the binoculars when a spacing between the two cover parts is adjusted to be substantially equal to a distance between the eyepieces of the binoculars, said adjustment affected by a rotation around the joint, wherein an angular position of the cover parts is adapted to be fixed once adjusted around the joint.

2. An eyepiece cover according to claim 1, the angular position of the two cover parts is adapted to be fixed by frictional engagement once it is adjusted with the joint.

3. An eyepiece cover according to claim 1, wherein said joint is separate and distinct from the binoculars and said eyepiece cover is completely detachable from the binoculars.

4. An eyepiece cover according to claim 1, wherein said angular position of the cover parts is adapted to be fixed independently of the binoculars.

5. An eyepiece cover for a pair of binoculars, comprising:

two cover parts connected by a joint and adapted to be slipped on respective eyepieces of the binoculars when a spacing between the two cover parts is adjusted to be substantially equal to a distance between the eyepieces of the binoculars, said adjustment affected by a rotation around the joint, wherein an angular position of the cover parts is adapted to be fixed once adjusted around the joint and said joint is formed by (i) a hinge joint with a cylindrical joint head mounted on one of the two cover parts and (ii) a joint sleeve pivotally engaging the joint head and which is mounted on the other of the two cover parts.

6. An eyepiece cover according to claim 5, wherein at least one of the joint sleeve and the joint head has a joint surface with a high coefficient of friction to form the frictional engagement.

7. An eyepiece cover according to claim 6, wherein the joint surface of the joint sleeve and/or the joint head is provided with knurl or similar rough surface to form a high coefficient of friction.

8. An eyepiece cover according to claim 5, wherein said joint head is formed by cylindrical segments which are at least partly spring-loaded against said joint sleeve.

9. An eyepiece cover according to claim 8, wherein at least part of the cylindrical segments of said joint head are provided with outwardly protruding snap hooks which grasp behind said joint sleeve slipped on said joint head so as to form a snap connection.

10. An eyepiece cover for a pair of binoculars, comprising;

two cover parts connected by a joint and adapted to be slipped on respective eyepieces of the binoculars when a spacing between the two cover parts is adjusted to be substantially equal to a distance between the eyepieces of the binoculars, said adjustment affected by a rotation around the joint wherein an angular position of the cover parts is adapted to be fixed once adjusted around the joint: and holding projections provided on an inside circumference of a saucer-shaped portion of the two cover parts for engaging and securing the eyepiece cover to the eyepieces of the binoculars.

11. Binocular lens covers comprising:

a first portion including (i) a first lens cover including means for engaging a portion of a binocular and (ii) a sleeve having a knurled inner surface; and a second portion including (i) a second lens cover including means for engaging another portion of said binocular and (ii) a joint head positioned within said sleeve and having a corresponding knurled outer surface for engaging said knurled inner surface of said sleeve;

wherein said first and second portions are rotatable with respect to each other about said joint head so as to adjust a distance between said first and second lens covers.

12. The binocular lens covers according to claim 11 further comprising a plurality of snap hooks attached to said joint head for engaging and retaining said joint head within said sleeve.

* * * * *